US011522938B2

(12) United States Patent
Taghavi et al.

(10) Patent No.: US 11,522,938 B2
(45) Date of Patent: *Dec. 6, 2022

(54) FEATURE GENERATION FOR ONLINE/OFFLINE MACHINE LEARNING

(71) Applicant: Netflix, Inc., Los Gatos, CA (US)

(72) Inventors: Mohammad Hossein Taghavi, Sunnyvale, CA (US); Prasanna Padmanabhan, Fremont, CA (US); Dong-Bang Tsai, San Jose, CA (US); Faisal Zakaria Siddiqi, San Jose, CA (US); Justin Derrick Basilico, Saratoga, CA (US)

(73) Assignee: Netflix, Inc., Los Gatos, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/174,317

(22) Filed: Feb. 11, 2021

(65) Prior Publication Data

US 2021/0168184 A1 Jun. 3, 2021

Related U.S. Application Data

(63) Continuation of application No. 16/557,558, filed on Aug. 30, 2019, now Pat. No. 10,958,704, which is a
(Continued)

(51) Int. Cl.
*H04L 65/75* (2022.01)
*G06N 5/04* (2006.01)
(Continued)

(52) U.S. Cl.
CPC ............ *H04L 65/762* (2022.05); *G06N 5/04* (2013.01); *G06N 20/00* (2019.01); *H04L 65/70* (2022.05);
(Continued)

(58) Field of Classification Search
CPC .. G06F 16/9535; G06F 16/248; G06F 16/335; G06F 16/337; G06Q 30/0269;
(Continued)

(56) References Cited

U.S. PATENT DOCUMENTS 8,510,238 B1\* 8/2013 Aradhye ................ H04W 4/50
706/12
9,129,227 B1\* 9/2015 Yee ...................... G06N 3/0472
(Continued)

OTHER PUBLICATIONS

Simon Dooms. Dynamic generation of personalized hybrid recommender systems. 2013 in Proceedings of the 7th ACM conference on Recommender systems (ReeSys '13). Association for Computing Machinery, New York, NY, USA, 443-446 (Year: 2013).\*
(Continued)

*Primary Examiner* — David R Lazaro
(74) *Attorney, Agent, or Firm* — FisherBroyles, LLP

(57) ABSTRACT

A system for utilizing models derived from offline historical data in online applications is provided. The system includes a processor and a memory storing machine-readable instructions for determining a set of contexts of the usage data, and for each of the contexts within the set of contexts, collecting service data from services supporting the media service and storing that service data in a database. The system performing an offline testing process by fetching service data for a defined context from the database, generating a first set of feature vectors based on the fetched service data, and providing the first set to a machine-learning module. The system performs an online testing process by fetching active
(Continued)

service data from the services supporting the media streaming service, generating a second set of feature vectors based on the fetched active service data, and providing the second set to the machine-learning module.

20 Claims, 6 Drawing Sheets

Related U.S. Application Data continuation of application No. 15/331,106, filed on Oct. 21, 2016, now Pat. No. 10,432,689.

(60) Provisional application No. 62/295,462, filed on Feb. 15, 2016.

(51) Int. Cl.
    *G06N 20/00*     (2019.01)
    *H04L 65/70*     (2022.01)
    *H04L 67/50*     (2022.01)
    *H04L 67/306*     (2022.01)
    *H04N 21/24*     (2011.01)
    *G06F 16/335*     (2019.01)
    *G06F 16/9535*     (2019.01)
    *H04L 67/303*     (2022.01)
    *H04N 21/25*     (2011.01)
    *H04N 21/258*     (2011.01)

(52) U.S. Cl.
CPC .......... *H04L 67/535* (2022.05); *G06F 16/335* (2019.01); *G06F 16/9535* (2019.01); *H04L 67/303* (2013.01); *H04L 67/306* (2013.01); *H04N 21/2407* (2013.01); *H04N 21/252* (2013.01); *H04N 21/25891* (2013.01)

(58) Field of Classification Search
CPC ............. G06Q 30/0631; H04N 21/252; H04N 21/25841; H04N 21/25891; H04L 65/4084; H04L 67/22
See application file for complete search history.

(56) References Cited

U.S. PATENT DOCUMENTS

| | | | | |
|---|---|---|---|---|
| 10,432,689 | B2* | 10/2019 | Taghavi | H04L 67/535 |
| 10,958,704 | B2* | 3/2021 | Taghavi | H04L 67/535 |
| 2003/0101449 | A1* | 5/2003 | Bentolila | H04N 21/4663 |
| | | | | 348/E7.07 |
| 2010/0191680 | A1* | 7/2010 | Lee | H04H 60/46 |
| | | | | 706/54 |
| 2011/0184806 | A1* | 7/2011 | Chen | G06Q 30/0257 |
| | | | | 705/347 |
| 2012/0158791 | A1* | 6/2012 | Kasneci | G06F 16/9024 |
| | | | | 707/E17.03 |
| 2014/0067597 | A1* | 3/2014 | Kirkby | G06Q 30/0631 |
| | | | | 705/26.7 |
| 2015/0178282 | A1* | 6/2015 | Gorur | G06F 16/9535 |
| | | | | 707/748 |
| 2016/0300156 | A1* | 10/2016 | Bowers | G06F 16/2465 |
| 2016/0371589 | A1* | 12/2016 | Golbandi | G06N 20/00 |
| 2017/0076318 | A1* | 3/2017 | Goswami | G06Q 30/0276 |
| 2017/0140285 | A1* | 5/2017 | Dotan-Cohen | G06F 3/01 |
| 2017/0171580 | A1* | 6/2017 | Hirsch | H04L 67/62 |
| 2017/0237792 | A1* | 8/2017 | Taghavi | G06N 5/04 |
| | | | | 709/219 |
| 2018/0075137 | A1* | 3/2018 | Li | G06F 16/337 |
| 2019/0394252 | A1* | 12/2019 | Taghavi | H04L 65/70 |
| 2021/0168184 | A1* | 6/2021 | Taghavi | G06N 5/04 |

OTHER PUBLICATIONS

Non-Final Rejection received for U.S. Appl. No. 15/331,106 dated Feb. 5, 2019, 12 pages.

Notice of Allowance received for U.S. Appl. No. 15/331,106 dated May 22, 2019, 18 pages.

Non-Final Rejection received for U.S. Appl. No. 16/557,558 dated Aug. 7, 2020, 20 pages.

Notice of Allowance received for U.S. Appl. No. 15/331,106 dated Nov. 16, 2020, 22 pages.

\* cited by examiner

FEATURE GENERATION FOR ONLINE/OFFLINE MACHINE LEARNING

CROSS REFERENCE TO RELATED APPLICATION

This application is a continuation of U.S. application Ser. No. 16/557,558, filed 30 Aug. 2019, which is a continuation of U.S. application Ser. No. 15/331,106, filed 21 Oct. 2016, which claims the benefit of U.S. Provisional Application No. 62/295,462, filed 15 Feb. 2016, the disclosures of each of which are incorporated, in their entirety, by this reference.

TECHNICAL FIELD

The present disclosure relates generally to feature generation for machine-learning functions, and more particularly, to feature generation that can be used for offline testing of historically collected data and online testing from real-time data.

BACKGROUND

While consumers may access media items, such as movies and television shows, by receiving over the air signals or by subscribing to a cable or satellite television provider, increasingly consumers are accessing content over Internet-based systems. Some Internet-based systems allow users to download or stream content over the Internet to a variety of client devices. For example, an Internet-based media system may provide content to users via a personal computer, a set-top box, or a personal mobile device, such as a smart phone or tablet computer. In particular, streaming media systems enable users to access media content in a stream, such that the users may begin consuming (e.g., watching and/or listening to) content before the entirety of the content is delivered to the user's client device. Such a system allows users to access content while avoiding a potentially lengthy download process before beginning to consume their selected content.

To provide users with a satisfying, high-quality content experience, content service providers may provide content recommendations to users. Recommendations for a particular user or set of users may be based on a variety of factors including the particular user's location, personal viewing history, type of device being used to view the content, and other factors. It is desirable that recommendations be as close to what the user actually wishes to view as possible.

Various analytical tools may be used to create a system that recommends desired content to specific users. One such tool is machine learning. Machine learning involves the formulation of complex models and functions that are able to be predictive. Machine learning may involve, for example, providing a computing system with a set of example inputs and desired outputs so that the system can attempt to derive a general correlation that maps those inputs to the desired outputs. Such inputs may be complex n-dimensional data objects. Inputs in such formats are typically referred to as feature vectors, or simply features.

The efficacy of machine-learning tools is highly dependent upon the type of data that is provided to the machine-learning processes. Thus, it is desirable to experiment with different types of feature vectors that may provide better results from a machine-learning model. It is also desirable to test the models that have been derived from the machine-learning process in a live environment. In other words, it is desirable to determine whether the information obtained from the machine-learning model provides better recommendation outcomes. It is desirable that experimenting with different types of inputs and performing live testing be performed in a time efficient and effective manner.

Figure 1:
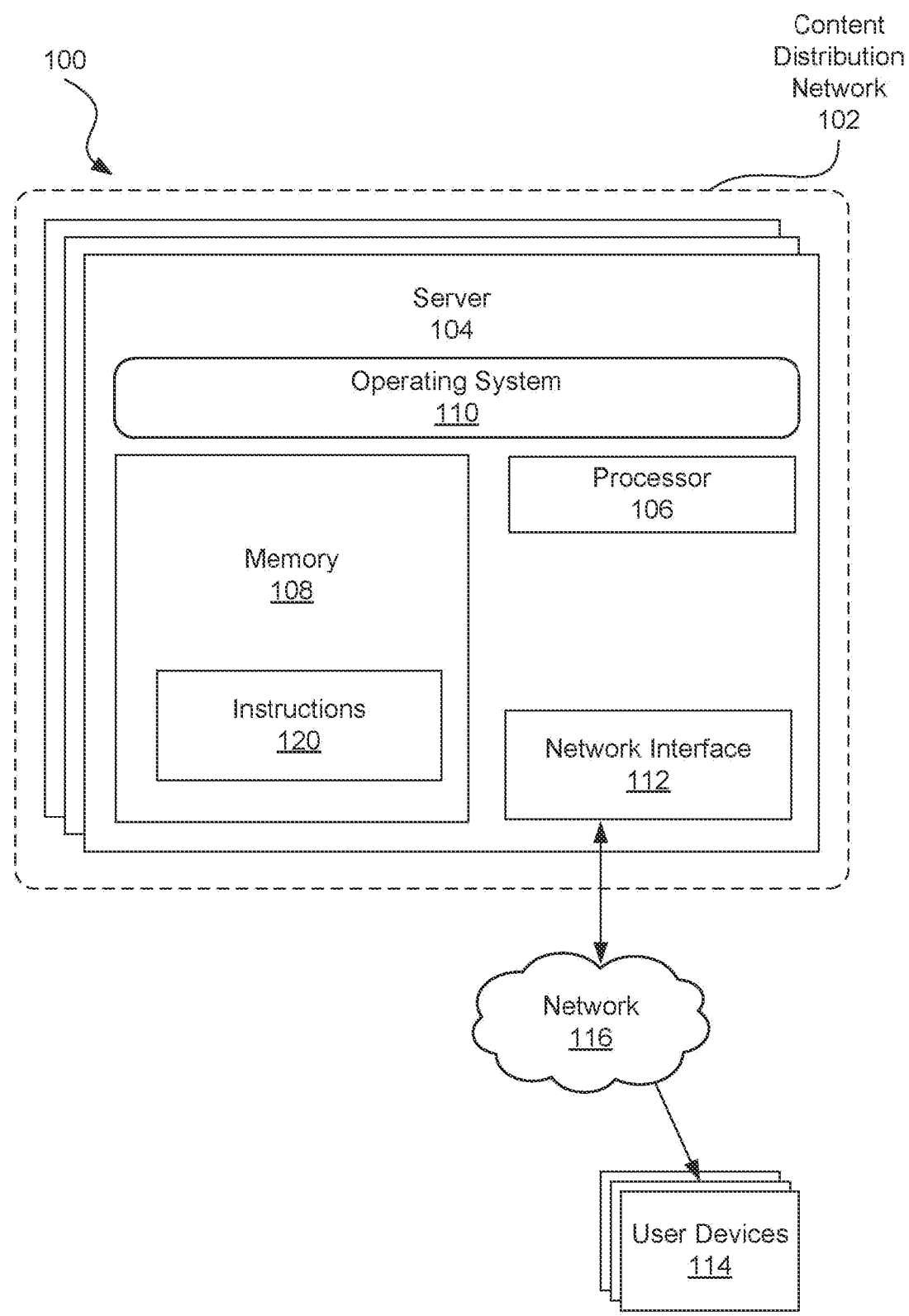
FIG. 1 is a block diagram of a streaming media system that allows users to access streaming media items according to some embodiments of the present disclosure.

These drawings will be better understood by those of ordinary skill in the art by reference to the following detailed description.

DETAILED DESCRIPTION OF EXEMPLARY EMBODIMENTS

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps have not been described in detail in order to avoid unnecessarily obscuring the present disclosure. Additionally, other applications of the concepts and principles described herein are possible, such that the following examples should not be taken as limiting. For example, while many of the examples disclosed herein are directed to streaming media, the principles and concepts described may be applied to provide recommendations in a system that additionally or alternatively provides media items for consumption in other manners, such as purchase, rental, download, etc.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these examples are not limiting, such that other embodiments may be used, and changes may be made without departing from the spirit and scope of the invention. Additionally, features of the different embodiments of the present disclosure may be combined in other embodiments.

As described above, it is desirable that experimenting with different types of feature vectors and performing live testing be performed in a time efficient and effective manner. Using conventional testing methods, experimenting with new feature vectors is a time intensive task. Particularly, because specific pieces of data may be used to create different feature vectors, the testing process involves collecting those specific pieces of data over a period of time for use with a specific feature vector. Then, after that data has been collected and the machine-learning process provides a new model, that model is tested in an online environment. Because the online environment may be different than the environment in which the data was collected, the switch from the offline data collection process to the online testing process may require a substantial rework of the testing process.

To avoid this and other issues, the present disclosure is directed to a method of assembling data in a manner that allows an offline testing process to use that data for a variety of different feature vectors that may be conceived. The data is also collected in a manner that allows for feature generation from both the collected data and live data using the same feature encoders. Additionally, methods and systems described herein provide for an efficient and seamless transition from the offline testing process to the online testing process, so as to avoid changes between these two different operating domains. This may result in faster implementation of complex models that are positively indicated in offline testing into an online operation. The fidelity between these models in the offline and online environments may facilitate the ongoing monitoring of models, which may provide information that can be used to improve the offline testing process.

According to one example of principles described herein, usage data for a primary service (e.g., a media streaming service) that may be relevant for feature generation is periodically collected for various "contexts." "Contexts" may be, for example, a user profile, a time of day, types of devices used to access the service, IP addresses of user devices, etc. For example, if the context is a user profile, then the data associated with a subset of all user profiles may be periodically assembled. This data will be referred to herein as context data. For each piece of context data that is collected, data is collected from various secondary services that support the primary service. For example, the media streaming service may use a viewing history service that keeps track of a user's viewing history. Relevant data obtained from secondary services may be collected for each of the sampled contexts. Data obtained from the secondary services will be referred to as service data. The service data as well as the context data can be packaged together and stored in a storage medium such as a database. The packaged service data and context data together will be referred to as "snapshot data."

The snapshot data may be collected over time so that when it is desired to perform offline testing of a new type of feature vector, the feature vectors may be encoded using data obtained from the snapshot data. In other words, data from the snapshot data is used as an input to a feature encoder that creates feature vectors. These feature vectors can then be fed into a machine-learning system. Thus, because the snapshot data is available, the machine-learning system can be supplied with data from a period of time in the past instead of having to obtain data for that specific feature vector in real time. This allows a new type of feature vector to be tested much more quickly.

Additionally, the machine-learning system can easily be transitioned for use with online testing. For example, to further improve a machine-learning model, feature vectors may be created using service data from the live services instead of service data from the snapshot data. Because the snapshot data can be formatted similar to live service data (i.e, the snapshot data is loaded as the same object type as the live service data), the same feature encoders used for offline testing can be used for online testing as well. Thus, the transition from offline testing to online testing is seamless compared to conventional approaches.

FIG. 1 is a block diagram of a streaming media system 100 that allows users to access streaming media content. Other embodiments may not be streaming-based embodiments, but may provide for media content to be downloaded and then consumed. According to the present example, the streaming media system 100 includes a server 104 within a content distribution network 102. The server 104 may be one of several similar servers in the content distribution network 102. The server 104 and/or other similar servers within the content distribution network 102 may perform the functions described herein. The content distribution network 102 may also be in communication with consumer devices 114 over a network 116 such as the Internet.

According to the present example, the server 104 includes a processor 106 and a memory 108. The server 104 also includes a network interface 112. The memory 108 may include machine readable instructions 120 for execution on the processor 106. Such instructions may be associated with various applications as well as an operating system 110.

The server 104 may be one of a variety of servers. Exemplary servers may include, for example, stand-alone and enterprise-class servers operating a server operating system (OS) such as a MICROSOFT® OS, a UNIX® OS, a LINUX® OS, or another suitable server-based operating system. It can be appreciated that the server 104 illustrated in FIG. 1 may be deployed in other ways and that the operations performed and/or the services provided by such servers may be combined or separated for a given implementation and may be performed by a greater number or fewer number of individual server devices. One or more servers may be operated and/or maintained by the same or different entities. As illustrated, the server 104 is operated by a streaming media service provider.

The network interface 112 may be a network interface card or network interface controller (NIC) that permits the server 104 to communicate with other devices over the network 116. For example, the network interface 112 allows the server 104 to communicate with the client devices 114 over the network 116. The network interface 112 may utilize a variety of communication technologies including Ethernet, coaxial, fiber optic, and wireless communication technologies.

The memory 108 may include a plurality of memory modules. The memory modules may be of varying types. Some of the memory 108 may be volatile memory such as Random Access Memory (RAM). Some of the memory 108 may be non-volatile memory such as hard disk drives or SSDs. The memory 108 may store machine-readable instructions 120 for execution on the processor 106. Some of the instructions 120 may be part of the operating system. The operating system provides various applications, such as web servers and media streaming applications, with access to the server 104's hardware resources. Such hardware resources include the processor 106, the memory 108, and the network interface 112.

Figure 2:
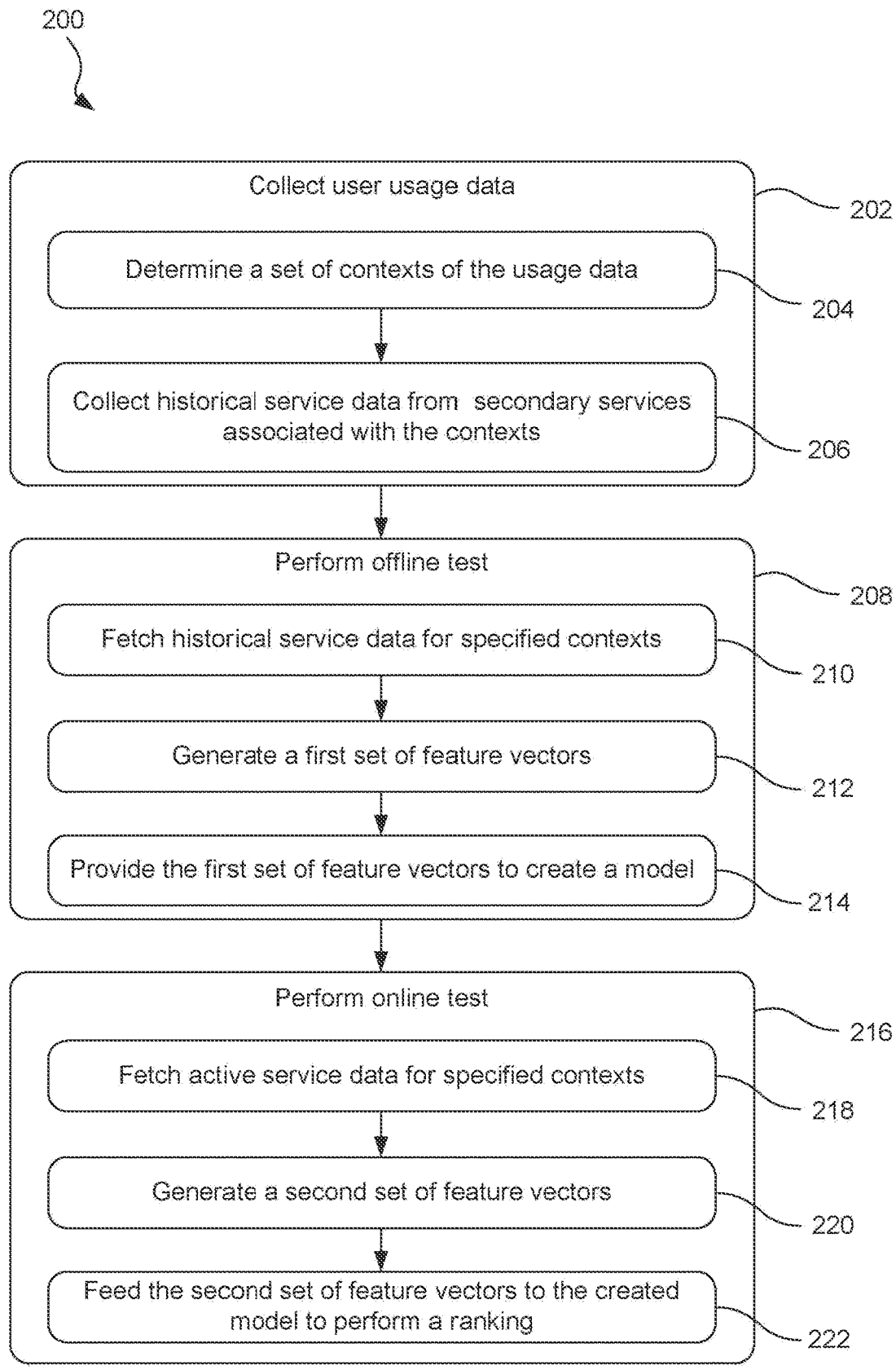
FIG. 2 is a flowchart showing an illustrative method for feature generation for a machine-learning process according to some embodiments of the present disclosure.

FIG. 2 is a flowchart showing an illustrative method 200 for feature generation of online and offline testing. The method 200 is illustrated as a series of enumerated steps or operations. Embodiments of the method 200 may include additional operations before, after, in between, or as part of the enumerated operations. Additionally, some embodiments may omit one or more of the enumerated operations, which may be performed by the server 104 of FIG. 1.

According to the present example, the method 200 includes, at operation 202, collecting usage data. Usage data is generated during operations of a primary service. For example, as a media streaming service is operated, it generates usage data indicating user interactions with the service such as videos played by users, the regions in which users play the video, the ratings provided by various groups of users for a particular video, etc.

Collecting data involves, at operation 204, determining a set of contexts of the usage data. For example, the data collecting process may involve collecting data for several different contexts (e.g., user profiles, geographic regions, device types). For each context, a subset of the total available context instances is collected. In the case where the context is "user profile," then a subset of all user profiles may be collected. The subset may be collected because a subset may be sufficient for testing purposes.

Collecting data further involves, at operation 206, collecting service data from secondary services associated with the contexts. Moreover, collecting a snapshot of service data from secondary services of all user profiles on a periodic basis may unnecessarily consume computing resources. As described above, the primary service, such as a media streaming service, may utilize several secondary services. The secondary services will be described in further detail below. In the case for the contexts is user profile, and for each user profile collected, data from secondary services associated with that user profile is collected as well. As will be described in further detail below, the context data and the service data may be packaged together and referred to as snapshot data. More detail regarding collecting usage data will be described below in the text accompanying FIG. 3.

The method 200 further includes, at operation 208, performing an offline test. For example, an experimenter may design a new experiment with a new type of feature vector. The experimenter may thus define the data to be used to create the feature vectors. In other words, the experimenter defines the contexts that are relevant for the type of feature vector.

Performing the offline test includes, at operation 210, fetching historical service data (i.e. snapshot data) for specified contexts. For example, the service data associated with the context data is fetched from a snapshot database. At operation 212, the method 200 further includes generating a first set of feature vectors based on the fetched service data. At operation 214, the method 200 further includes providing the first set of feature vectors to a model, such as a machine-learning system or process. The machine-learning system may also be provided with a target as defined by the experimenter. The machine-learning system may then drive a general correlation or correspondence that maps the feature vector inputs to desired target outputs. More detail regarding performing the offline test will be described below in the text accompanying FIG. 4.

The method 200 further includes, at operation 216, performing an online test. For the online test, service data is obtained from the live secondary services instead of the snapshot data. Service data from the live secondary services will be referred to as active service data. At operation 218, active service data is obtained from the specified contexts. Using this active service data, at operation 220, the method further includes generating a second set of feature vectors. The second set of feature vectors may be generated using the same feature encoders used to generate the first set of feature vectors. At operation 222, the method 200 may further include providing the second set of feature vectors to the machine-learning process. More detail regarding performing online testing is described below in the text accompanying FIG. 5.

Figure 3:
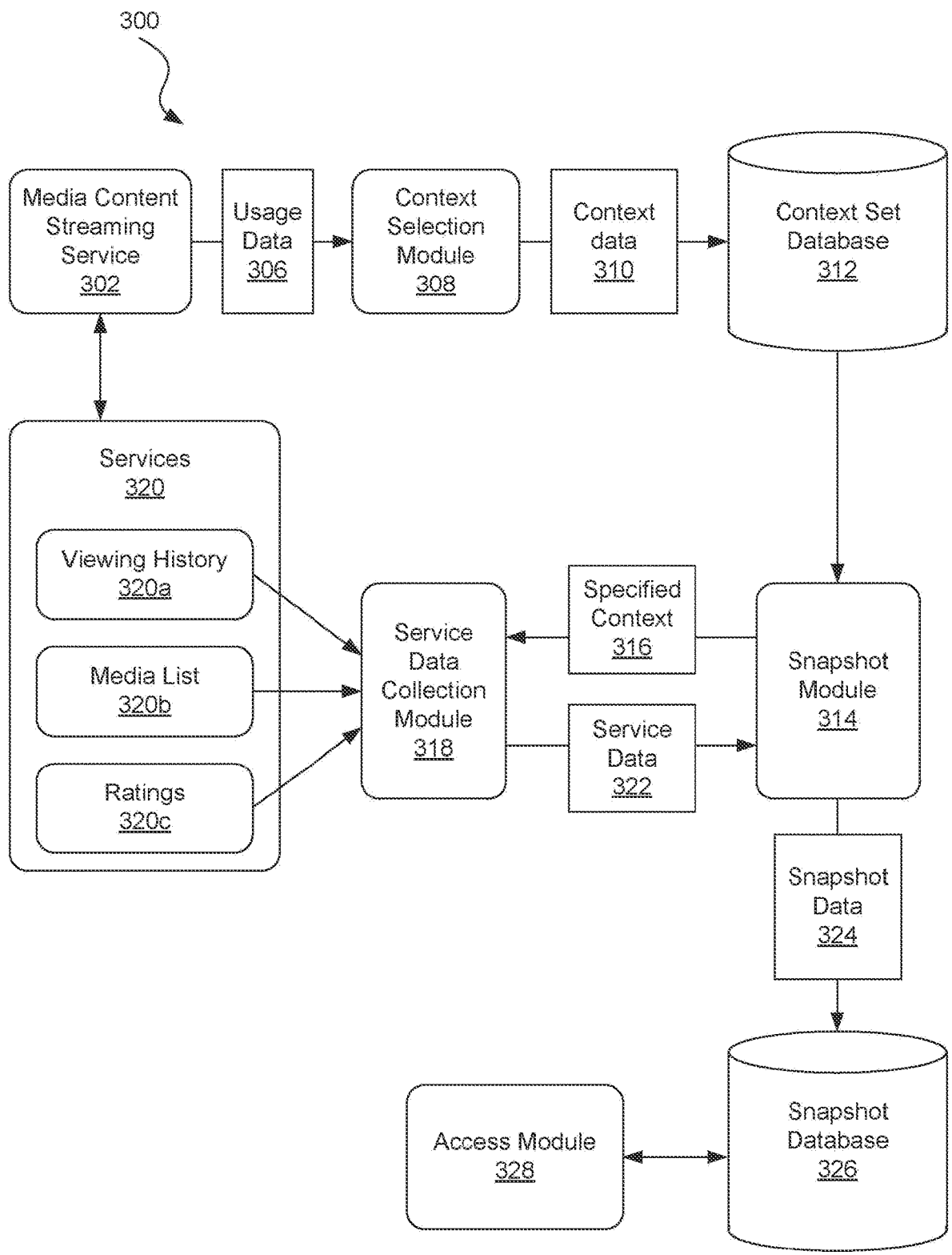
FIG. 3 is a diagram showing illustrative data collection to be used by a feature generation process according to some embodiments of the present disclosure.

FIG. 3 is a diagram showing an illustrative environment 300 in which collection of data may be used by a feature generation process. According to the present example, the media streaming service 302 generates usage data 306 as the service 302 is being operated. For example, if a user of the service 302 makes changes to his or her profile by watching certain content, browsing content, or providing a rating for a consumed piece of content, then usage data 306 associated with that user's profile is generated.

The context selection module 308 includes the hardware, software, or combination of both to periodically collect context data 310 from the usage data 306. The context data 310 is then stored in the context set database 312. A context may be, for example, a user profile, a type of device, an IP address associated with the user, a location associated with the user, or a time of day, etc. Other contexts are contemplated as well. In one example, the context selection module 308 is configured to periodically collect usage data 306 associated with a particular context. For example, the context selection module 308 may periodically use data associated with user profiles. In some examples, the total number of user profiles available may be more than sufficient for testing purposes. Accordingly, only a subset of the total available user profiles may be collected, in some embodiments. The subset of user profiles may be randomly selected or may be selected based on a predefined function.

In some examples, the user profiles being collected may be part of the subcategory of user profiles. For example, the user profile data being collected may be associated with users in a particular geographic region. Additionally or alternatively, user profile data from users having indicated an interest in a particular genre or categorization of content may be collected. Other subcategories of contexts are contemplated as well. The context selection module 308 may periodically collect contexts within a variety of subcategories. For example, each day, the context selection module 308 may collect data associated with contexts of several different subcategories.

The context selection module 308 may be configured to collect context data 310 over a period of time at specified time intervals. For example, the context selection module 308 may obtain context data 310 on a daily basis. The context selection module 308 may also obtain data hourly, or weekly. Other time intervals are contemplated as well.

The context set database 312 is made available to the snapshot module 314. The snapshot module 314 includes the hardware, software, or combination of both to obtain selected pieces of context data 310 from the context set database 312. The snapshot module 314 is also configured to obtain service data 322 from the service data collection module 318. The snapshot module 314 then uses the context data 310 and the service data 322 to create snapshot data 324.

The media streaming service 302 may utilize a service oriented architecture (SOA). Thus, the media streaming service 302, which may be referred to as a primary service, utilizes several secondary services 320. In the present example, the secondary services 320 include a viewing history service 320*a*, a media list service 320*b*, and a rating service 320*c*. The viewing history service 320*a* may provide the media streaming service 302 with data about the viewing history of each user profile. Thus, when a user performs an action that involves determining the user's viewing history, the media streaming service 302 may call the viewing history service 320*a* to obtain viewing history information. The media list service 320*b* may provide the media streaming service 302 with information about a user's defined list of content in which that user is interested. When an action is performed that relies on data from the media list service 320*b*, the media streaming service 302 calls to the media list service 320*b*. The rating service 320*c* provides the media streaming service 302 with data related to the ratings that users have provided for a specific piece of content. When an action is performed that relies on the rating service 320*c*, the media streaming service 302 calls the rating service 320*c* to obtain ratings information. Each of the secondary services 320 may perform a variety of functions and provide a variety of different types of data related to their respective functions. The media streaming service 302 may rely on several other secondary services as well.

The secondary services 320 collect and organize usage data as well. In many cases, this data is associated with the contexts (e.g., user profiles). Accordingly, to provide better historical data, the snapshot module 314 obtains service data 322 that is generated by the secondary services 320. Specifically, the snapshot module 314 provides a specified context 316 to the service data collection module 318. The service data collection module 318 includes hardware, software, or a combination of both to obtain the relevant service data 322 from the secondary services 320 associated with the specified context 316. The service data collection module 318 then provides that service data 322 back to the snapshot module 314. In some examples, the service data collection module 318 or the snapshot module 314 may format the service data 322 into a condensed format for storage purposes.

For example, the snapshot module 314 may obtain set of user profiles from the context set database 312. For each of those user profiles, the snapshot module 314 may obtain service data 322 such as the viewing history of those user profiles or the ratings that the user profile has provided for various pieces of content. Other types of information associated with the user profiles and various other services may be obtained as well.

The snapshot module 314 then packages the context data 310 as well as the service data 322 associated with the context data 310. This packaged data will be referred to as snapshot data 324. The snapshot data 324 may then be placed in the snapshot database 326. The snapshot data 324 may then be accessed by an access module 328. The access module includes hardware, software, or a combination of both to provide other modules with access to the snapshot data 324 within the snapshot database 326. For example, the access module 328 may provide an offline testing module with access to the snapshot database 326.

In some examples, the snapshot module may assign a confidence value to a particular snapshot. The confidence value may be used to indicate the quality of the data within the snapshot. For example, if some of the service data for a particular context was currently unavailable or lacking, then a lower confidence value may be assigned to such a snapshot. Ensuring the data quality of the snapshots in the snapshot data 324 may be critical to correctly evaluating models. The confidence value or confidence level for each snapshot service may be stored in the snapshot data 326. In some embodiments, the confidence value may be based on the percentage of successful data fetches from the services 320 excluding any fallbacks due to timeouts or service failures. Operators of the environment 300 may access the confidence values when selecting snapshots in the snapshot data 324 via the access module 328, which may provide a graphical or text-based user interface for the generation, performance, and analysis of experiments.

Conversely, if sufficient data is present and available for a particular snapshot, that snapshot may be assigned a higher confidence value.

Figure 4:
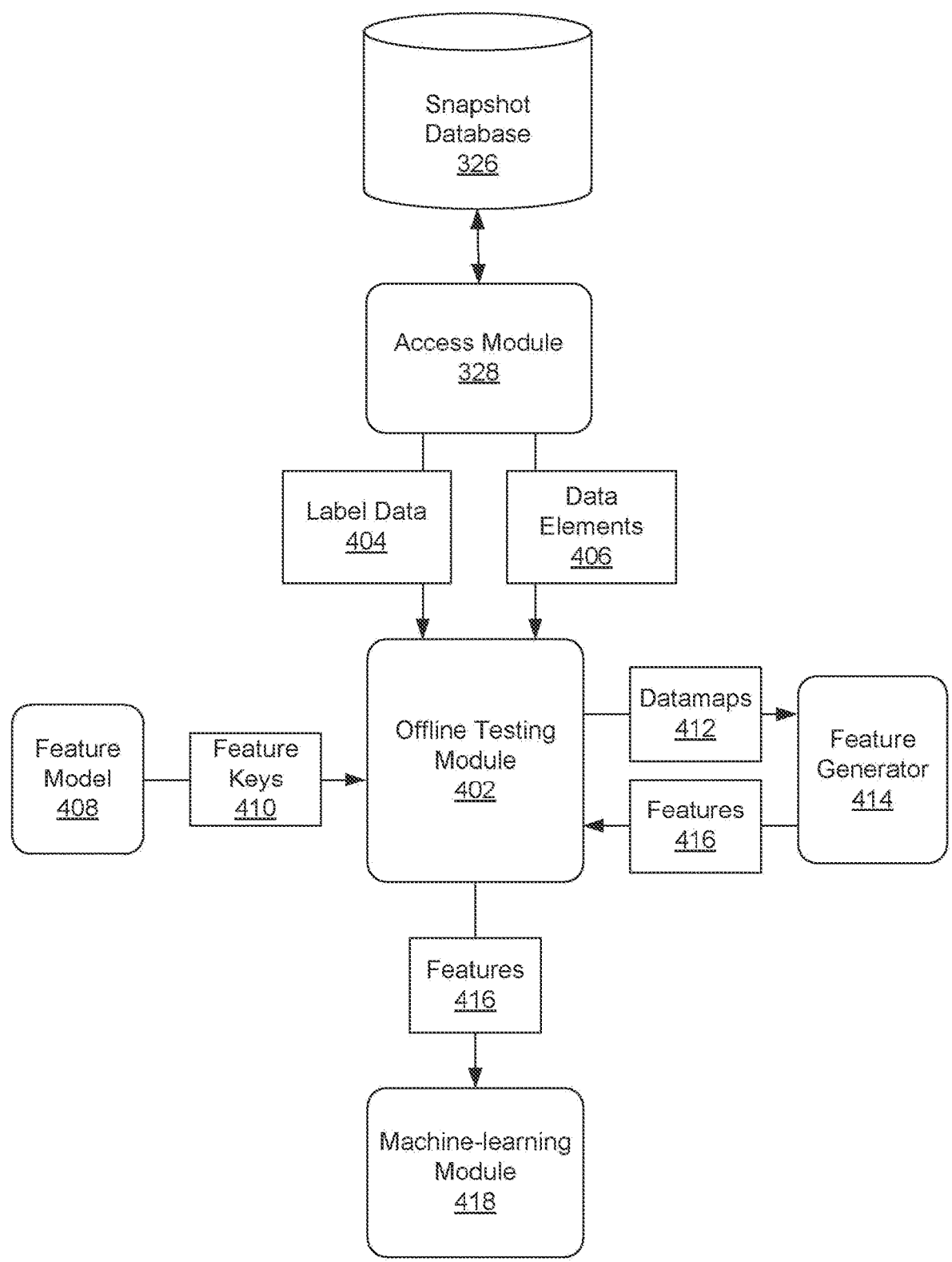
FIG. 4 is a diagram showing an illustrative feature generation process for offline testing according to some embodiments of the present disclosure.

FIG. 4 is a diagram showing an illustrative feature generation process for offline testing. The offline testing module 402 includes the hardware, software, or combination of both to use the snapshot data 324 for offline testing purposes. Particularly, the offline testing module 402 uses the snapshot data to generate features 416 that are then provided to a machine-learning module 418.

To perform an offline experiment, the offline testing module 402 is provided with label data 404 and feature keys 410. The label data 404 provides the manner in which a context data is to be used. For example, the label data may define a set of contexts that were obtained during a specified period of time in the past. The label data 404 may also define the targets to be used in a supervised machine-learning process. The targets may define the desired outputs or outcomes that are desired for a particular set of inputs. The machine-learning process may then derive a general correlation that for a given set of inputs, application of such correlation results in the desired outputs. For example, the target may be that a particular user plays a piece of content, such as a recommended piece of content or a searched-for piece of content. The label data 404 may also define items to be tested or ranked. For example, an item may be a particular piece of content or set of content. It may be desired to run an experiment to determine that if a particular piece of item (e.g., content) is recommended to a particular context (e.g., user), then that user is likely to accept that recommendation and play (e.g., target) that content.

In some examples, the offline testing module 402 may convert the condensed service data of the snapshot data back into its original form, or in other words, a non-condensed format. Thus, the service data may appear to the feature encoder as though it were being obtained from live or active secondary services. This further increases the efficiency of switching from offline testing to online testing, as will be described in further detail below.

The data elements 406 are the pieces of data from the snapshot data that get transformed into features 416. Each data element 406 is identified by a data key. Some data elements may be context-dependent. For example viewing history for particular user profile is a context-dependent data element. Some data elements 406 may be context-independent. For example, metadata about particular pieces of content may be context-independent data elements 406.

The offline testing module 402 receives feature keys 410 from the feature model 408. The feature model 408 may be designed by an experimenter. The feature model 408 may define the nature of the features 416 to be created by the feature generator 414. Particularly, the feature model 408 may provide the feature keys 410 which are used by the offline testing module to create datamaps 412. The datamaps 412 provide the feature generator 414 with a map from the data keys identified by the feature keys 410 to the actual data objects to be used by the feature generator 414. The feature generator 414 includes hardware, software, or a combination of both to create the features 416. The feature generator 414 sends the generated features 416 to the offline testing module 402, which then pass the features 416 to the machine-learning module 418.

The machine-learning module 418 processes the features to provide results to the experimenter. For example, the machine-learning module 418 may derive a general rule indicating that users who watch a particular genre of content are likely to accept a recommendation for a particular piece of content. If the information gathered from the machine-learning module 418 is positive, then the experimenter may seek to implement the experiment using online data instead of offline data.

Figure 5:
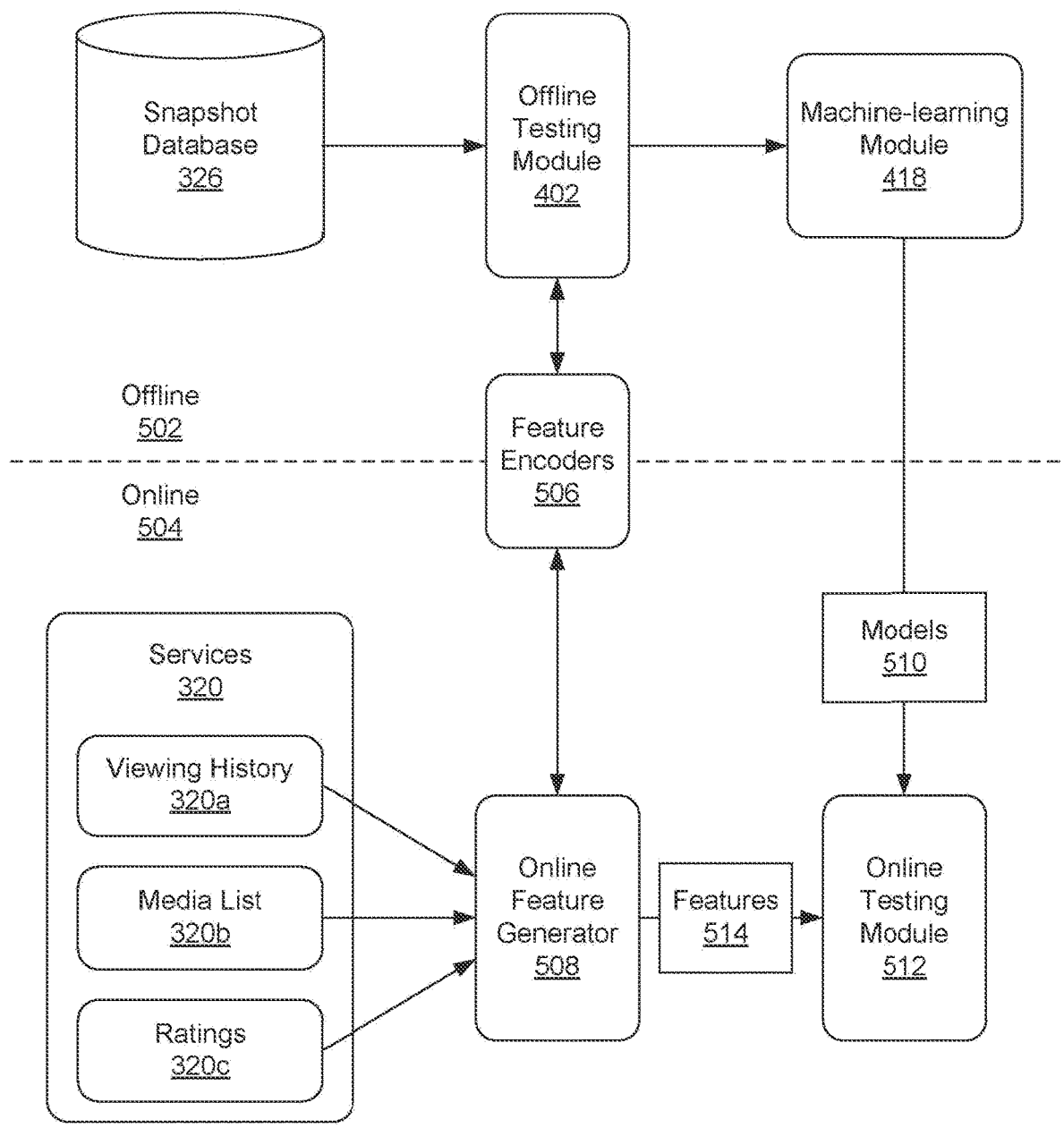
FIG. 5 is a diagram showing an illustrative feature generation process for online testing according to some embodiments of the present disclosure.

FIG. 5 is a diagram showing an illustrative feature generation process for online testing. As described above, the offline testing module 402 uses historical data compiled into the snapshot database 326 to provide features to the machine-learning module 418. This allows an experimenter to design new experiments and run tests using historical data without having to take the time to collect real-time data for the new experiment. At some point, the experimenter may command transition of the experiment from an offline process 502 to an online process 504.

To provide a seamless transition between offline testing and online testing, the feature encoders 506 used by the feature generator (e.g. 414, FIG. 4) associated with the offline testing module 402 are also used by an online feature generator. The online feature generator 508 may operate in a similar manner to the offline feature generator 414. However, instead of using data elements from the snapshot database 326, the online feature generator obtains active data from the active secondary services 320. The online feature generator may then provide additional features 514 to an online testing module 512.

The online testing module 512 includes hardware, software, or a combination of both to run an online testing process. The online testing module 512 may use the features 514 from the online feature generator 508. The online testing module 512 may also use models 510 provided by the machine-learning module 418 from the offline process. The models 510 may represent the correlations derived from the machine-learning process.

The online testing module 512 may use the received information to perform live tests. In one example, the online testing module may perform a live A/B test. An A/B test is a test in which one set of subjects is tested without a particular variance and another set of subjects is tested with the variance. For example, the A/B test applied by the online testing module 512 may collect data on a certain set of users to which a newly derived correlation is not applied, and collect data on a different set of users to which the newly derived correlation is applied. For example, showing a particular image associated with a particular media item may increase consumption of the particular media item for a particular user or subset of users. Using various metrics, such as user retention or content play-time, the collected data may indicate a positive or negative result when the new correlation is applied.

Because the online feature generator uses the same feature encoders as the offline feature generator, and because both feature generators use the same type of input data, the transition from offline testing to online testing is more efficient. Moreover, because the offline testing process is designed to use data collected from time periods in the past, new experiments can be designed and tested quickly. Thus, little time is wasted if an offline experiment does not yield acceptable results.

Figure 6:
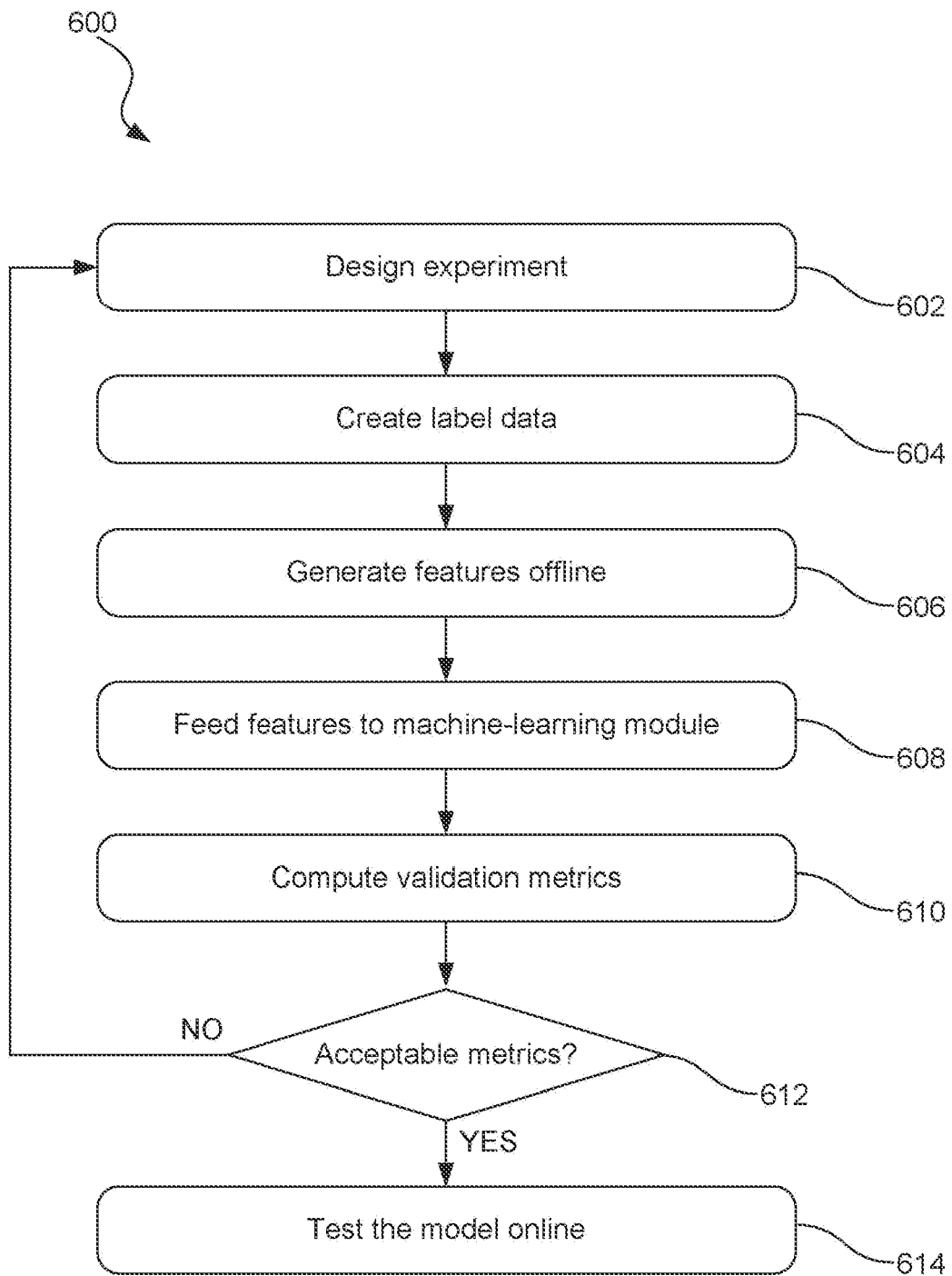
FIG. 6 is a flowchart showing an illustrative method for designing an experiment according to some embodiments of the present disclosure.

FIG. 6 is a flowchart showing an illustrative method 600 for transitioning on offline machine-learning experiment to an online environment. The method 600 is illustrated as a series of enumerated steps or operations. Embodiments of the method 600 may include additional operations before, after, in between, or as part of the enumerated operations. Additionally, some embodiments may omit one or more of the enumerated operations, which may be performed by the server 104 of FIG. 1.

According to the present example, at operation 602, the method 600 includes designing the experiment. For example, an experimenter may wish to determine the likelihood that a user will accept a recommended piece of content based on a variety of characteristics of that user's profile or based on variations in the presentation of the recommended piece of content. At operation 604, the experimenter may create label data. As described above, the label data defines the contacts, targets, and data items associated with a particular experiment.

At operation 606, the method 600 includes generating features offline. This may be done, for example, by the offline feature generator. At operation 608 the generated features are fed into the machine-learning module. The machine-learning module may then derive various models. This may be done, for example, using distributed model training. In some examples, individual models are trained in parallel.

At operation 610, validation metrics may be computed. For example, the experimenter may define various metrics to test the model. At operation 612, it is determined whether the metrics for the model (or plurality of models) are acceptable. If the metrics are acceptable, then the method 600 proceeds to operation 614, at which the model may be tested online. If, however, the metrics are not acceptable, then the method 600 returns to operation 602, at which the experimenter designs a new experiment. Using principles described herein, relatively little time is wasted if an experiment does not yield acceptable models. Particularly, because the offline testing process utilizes sampled data from past time periods, the model is able to be tested without having to wait for live data to feed to the machine-learning module.

Embodiments of the presently disclosed systems and methods described herein permit a system, such as a download-based media system or a streaming media system, to perform experiments in an offline environment to train machine learning systems with historical data and then seamlessly transition those systems to operate in an online environment in response to current user interactions. The problems overcome by the systems and methods described herein are unique to Internet-based systems that include offline and online operations.

Certain aspects of the present disclosure are set out the following numbered clauses:

1. A system comprising: a processor; and a memory storing machine-readable instructions that when executed by the processor, cause the processor to perform operations comprising: collecting, periodically, usage data representing usage of a media service, the collecting comprising: determining a set of contexts of the usage data, and for each of the contexts within the set of contexts, collecting service data from services supporting the media service and storing that service data in a database; performing an offline testing process comprising: fetching service data for a defined context from the database, generating a first set of feature vectors based on the fetched service data, and providing the first set of feature vectors to a machine-learning module; and performing an online testing process comprising: fetching active service data from the services supporting the media streaming service, generating a second set of feature vectors based on the fetched active service data, and providing the second set of feature vectors to the machine-learning module.

2. The system of clause 1, wherein the contexts include one of: user profiles, device types, or time period.

3. The system of any of clauses 1-2, wherein the services supporting the media service comprise one of: a viewing history service, a user media list service, and a ratings service.

4. The system of any of clauses 1-3, wherein the machine-readable instructions further cause the system to perform operations comprising determining a confidence value for a snapshot of collected usage data.

5. The system of any of clauses 1-4, wherein collecting usage data further comprises transforming service objects from the services into a condensed format.

6. The system of any of clauses 1-5, wherein fetching service data comprises restoring the service objects to a non-condensed format.

7. The system of any of clauses 1-6, wherein performing the offline testing process further comprises receiving label data defining contexts to be fetched.

8. The system of any of clauses 1-7, wherein the label data further defines items to be scored for the offline testing process.

9. The system of any of clauses 1-8, wherein the service data includes context-dependent data.

10. The system of any of clauses 1-9, wherein the service data includes context-independent data.

10.1 A non-transitory computer-readable storage medium storing instructions that, when executed by one or more processing devices, cause the processing devices to perform any of the features recited in any of clauses 1-10.

10.2 A method that, when implemented by one or more processing devices, performs operations providing any of the features recited in any of clauses 1-10.

11. A method comprising: collecting, over a period of time, usage data representing usage of a primary service, the collecting comprising: periodically determining a set of contexts of the usage data, and for each of the contexts within the set of contexts, collecting service data from secondary services supporting the primary service and storing that service data in a database; and performing an offline testing process comprising: fetching service data for a defined context from the database, generating a first set of feature vectors based on the fetched service data, and providing the first set of feature vectors to a machine-learning function.

12. The method of clause 11, further comprising: performing an online testing process comprising: fetching active service data from the secondary services; generating a second set of feature vectors based on the fetched active service data; and providing the second set of feature vectors to the machine-learning function.

13. The method of any of clauses 11-12, wherein the primary service is a media streaming service.

14. The method of any clauses 11-13, wherein the media streaming service utilizes a service oriented architecture.

15. The method of clauses 11-14, further comprising, determining a confidence value for a snapshot of collected usage data.

16. The method of any of clauses 11-15, wherein the secondary services include at least one of: a viewing history service, a user media list service, or a ratings service.

17. The method of any of clauses 11-16, wherein the contexts include one of: user profiles, device types, or time period.

17.1 A non-transitory computer-readable storage medium storing instructions that, when executed by one or more processing devices, cause the processing devices to perform any of the features recited in any of clauses 11-17.

17.2 A computing system that, when implemented by one or more processing devices, performs operations providing any of the features recited in any of clauses 11-17.

18. A method comprising: performing an offline testing process comprising: fetching service data for a defined context from a database, the database storing snapshots of previously collected context data, the previously collected context data being derived from usage data of a primary service, generating a first set of feature vectors based on the fetched service data, and providing the first set of feature vectors into a machine-learning function; and performing an online testing process comprising: fetching active service data from secondary services supporting the primary service, generating a second set of feature vectors based on the fetched active service data, and providing the second set of feature vectors to the machine-learning function.

19. The method of clause 18, wherein the service data for the defined context is collected periodically.

20. The method of any of clauses 18-19, wherein the offline process and the online process utilize the same feature encoders.

20.1 A non-transitory computer-readable storage medium storing instructions that, when executed by one or more processing devices, cause the processing devices to perform any of the features recited in any of clauses 11-17.

20.2 A computing system that, when implemented by one or more processing devices, performs operations providing any of the features recited in any of clauses 11-17.

Embodiments of the present disclosure may permit fluid transitions because offline and online machine learning environments. This may allow for improve identification of significant factors and permit a network-based content distribution system to execute services based on those factors. Embodiments of the president disclosure include combinations of disclosed features as well as modifications and incorporations as would be apparent to one of ordinary skill in the art. The embodiments are presented by way of example, not limitation. The scope and spirit of the disclosure are limited only by the following claims.

What is claimed is:

1. A system comprising:
a processor; and
a memory storing machine-readable instructions that when executed by the processor, cause the processor to perform operations comprising:
collecting service data from a media service;
initiating an offline testing process that generates a first set of features based on the collected service data using a specified feature encoder that is configured to encode the first set of features in a specified manner and provides the first set of features to a machine-learning module;
initiating an online testing process that generates a second set of features based on active service data collected from the media service using the same specified feature encoder the same encoding allowing the system to dynamically transition between the offline testing process and the online testing process and provides the second set of features to the machine-learning module; and
generating, by the machine-learning module, a likelihood that a specified user will accept a recommended piece of content based on the offline and online testing using the first and second sets of features.

2. The system of claim 1, wherein the likelihood that the specified user will accept the recommended piece of content based on the offline and online testing is generated based on one or more characteristics of a profile associated with the specified user.

3. The system of claim 2, wherein the one or more characteristics of the profile associated with the specified user comprises usage data associated with the specified user.

4. The system of claim 3, wherein the usage data is based on the specified user watching content, browsing content, or providing a rating for a consumed piece of content.

5. The system of claim 2, wherein the profile associated with the specified user is one of a plurality of different user profiles collected.

6. The system of claim 5, wherein a specified subset of the plurality of user profiles is selected randomly or is selected based on a predefined function.

7. The system of claim 5, wherein the plurality of different user profiles collected are collected from users having indicated an interest in a particular genre or categorization of content.

8. The system of claim 1, wherein the likelihood that the specified user will accept the recommended piece of content based on the offline and online testing is generated based on variations in the presentation of the recommended piece of content.

9. The system of claim 8, wherein variations in the presentation of the recommended piece of content include changes to a graphical user interface in which the recommended piece of content is displayed for selection.

10. The system of claim 1, wherein upon determining that the likelihood that the specified user will accept the recommended piece of content based on the offline and online testing is sufficiently high, the machine-learning module implements the active service data collected from the media service instead of the collected service data.

11. A method comprising:
collecting service data from a media service;
initiating an offline testing process that generates a first set of features based on the collected service data using a specified feature encoder that is configured to encode the first set of features in a specified manner and provides the first set of features to a machine-learning module;
initiating an online testing process that generates a second set of features based on active service data collected from the media service using the same specified feature encoder the same encoding allowing a dynamic transition between the offline testing process and the online testing process and provides the second set of features to the machine-learning module; and
generating, by the machine-learning module, a likelihood that a specified user will accept a recommended piece of content based on the offline and online testing using the first and second sets of features.

12. The method of claim 11, wherein the offline testing process further implements one or more portions of snapshot usage data to generate the first set of features.

13. The method of claim 11, wherein the offline testing process further creates one or more data maps according to a feature model designed to test specified features, the data maps being configured to map data keys to specific data objects that are used to generate the first set of features.

14. The method of claim 11, further comprising determining a confidence value for a snapshot of collected usage data.

15. The method of claim 14, wherein collecting usage data further comprises transforming service objects from the services into a condensed format.

16. The method of claim 15, further comprising restoring the service objects to a non-condensed format.

17. The method of claim 11, wherein performing the offline testing process further comprises receiving label data defining contexts to be fetched.

18. A non-transitory computer-readable medium comprising one or more computer-executable instructions that, when executed by at least one processor of a computing device, cause the computing device to:
collect service data from a media service;
initiate an offline testing process that generates a first set of features based on the collected service data using a specified feature encoder that is configured to encode the first set of features in a specified manner and provides the first set of features to a machine-learning module;
initiate an online testing process that generates a second set of features based on active service data collected from the media service using the same specified feature encoder the same encoding allowing a dynamic transition between the offline testing process and the online testing process and provides the second set of features to the machine-learning module; and
generate, by the machine-learning module, a likelihood that a specified user will accept a recommended piece of content based on the offline and online testing using the first and second sets of features.

19. The non-transitory computer-readable medium of claim 18, wherein the offline testing process is initiated before the online testing process begins collecting active service data.

20. The non-transitory computer-readable medium of claim 18, wherein the media service includes at least one of: a viewing history service, a user media list service, or a ratings service.

* * * * *